United States Patent
Yoshida et al.

(10) Patent No.: US 7,538,838 B2
(45) Date of Patent: May 26, 2009

(54) SEMI-TRANSMISSIVE LIQUID CRYSTAL DISPLAY PANEL

(75) Inventors: Koji Yoshida, Tottori (JP); Shinichiro Tanaka, Tottori (JP)

(73) Assignee: Epson Imaging Devices Corporation, Nagano (JP)

( * ) Notice: Subject to any disclaimer, the term of this patent is extended or adjusted under 35 U.S.C. 154(b) by 258 days.

(21) Appl. No.: 11/524,955

(22) Filed: Sep. 22, 2006

(65) Prior Publication Data

US 2007/0070273 A1 Mar. 29, 2007

(30) Foreign Application Priority Data

Sep. 26, 2005 (JP) ............... 2005-277245

(51) Int. Cl.
*G02F 1/1335* (2006.01)
(52) U.S. Cl. ...................... 349/114; 349/113
(58) Field of Classification Search ................. 349/114, 349/113, 138, 139
See application file for complete search history.

(56) References Cited

U.S. PATENT DOCUMENTS

| 2005/0030450 | A1* | 2/2005 | Okamoto et al. ............ 349/113 |
| 2005/0057704 | A1* | 3/2005 | Ootake et al. ................. 349/69 |
| 2005/0231670 | A1* | 10/2005 | Hashiguchi et al. ......... 349/138 |
| 2005/0270433 | A1* | 12/2005 | Ohue et al. .................... 349/38 |
| 2006/0132684 | A1* | 6/2006 | Tanaka ....................... 349/114 |
| 2007/0085955 | A1* | 4/2007 | Kimura ....................... 349/129 |

FOREIGN PATENT DOCUMENTS

| JP | 2003-167253 | 6/2003 |
| JP | 2004-69767 | 3/2004 |

* cited by examiner

*Primary Examiner*—Ellen Kim
(74) *Attorney, Agent, or Firm*—McDermott Will & Emery LLP

(57) ABSTRACT

An semi-transmissive liquid crystal display panel is provided with a first substrate divided into sections by signal lines and scan lines arranged so as to form a matrix, each section having a switching element and a pixel electrode, the pixel electrode having transmissive and reflective portions. Here, at least the reflective portion of the first substrate has an interlayer film formed therein for separating the pixel electrode and the switching element, and a reflecting layer located below the pixel electrode, the reflecting layer has a notch portion at the edge thereof, and the pixel electrode formed in the reflective portion is electrically connected to an electrode of the switching element via a contact hole that is formed through the interlayer film in a part thereof corresponding to the notch portion.

7 Claims, 8 Drawing Sheets

SEMI-TRANSMISSIVE LIQUID CRYSTAL DISPLAY PANEL

This application is based on Japanese Patent Application No. 2005-277245 filed on Sep. 26, 2005, the contents of which are hereby incorporated by reference.

BACKGROUND OF THE INVENTION

1. Field of the Invention

The present invention relates to a semi-transmissive liquid crystal display panel, and more particularly to a semi-transmissive liquid crystal display panel that can reduce contact hole formation time and thus offer a satisfactory production efficiency.

2. Description of Related Art

In recent years, it has been becoming increasingly popular to use liquid crystal display devices not only in information communication devices but also in commonly used electric devices. A liquid crystal display device itself does not emit light, and hence a transmissive liquid crystal display device provided with a backlight is widely used. Disadvantageously, the backlight consumes a large amount of electric power. It is for this reason that, to reduce the electric power consumption, portable devices in particular use a reflective liquid crystal display device that requires no backlight. The problem here is that this reflective liquid crystal display device uses external light as its light source, and hence suffers from poor visibility in a poorly-lit room, for example. It is under this background that semi-transmissive liquid crystal display devices that offer transmissive and reflective displays have been eagerly developed in recent years.

A liquid crystal display panel used in this semi-transmissive liquid crystal display device has pixel regions, each having a transmissive portion provided with a pixel electrode and a reflective portion provided with both a pixel electrode and a reflecting layer. In a poorly-lit place, this liquid crystal display panel displays an image by means of the transmissive portion of the pixel region by turning on the backlight; in a well-lit place, it displays an image by means of the reflective region illuminated by external light without turning on the backlight. This advantageously eliminates the need to keep the backlight on all the time, making it possible to greatly reduce the electric power consumption.

Now, since, for example, the users of mobile devices typified by mobile phones or the like are limited, there has conventionally not been so much demand to use a liquid crystal display panel having a wide viewing angle in small display portions of such mobile devices. However, with mobile devices becoming more and more sophisticated these days, there is a huge surge in demand for mobile devices having a display portion provided with a liquid crystal display panel having a wide viewing angle. To satisfy this demand, instead of TN (twisted nematic) liquid crystal display panels that have been conventionally frequently used in mobile devices, MVA (multi-domain vertically aligned) semi-transmissive liquid crystal display panels have come to be developed increasingly eagerly (see JP-A-2003-167253 (claims, paragraphs [0050] to [0057], FIG. 1) and JP-A-2004-069767 (claims, paragraphs [0044] to [0053], FIG. 1)).

Here, an MVA semi-transmissive liquid crystal display panel disclosed in JP-A-2004-069767 will be described with reference to FIGS. 5A, 5B, and 6. FIG. 5A is a perspective view schematically showing the structure of an MVA semi-transmissive liquid crystal display panel 50. FIG. 5B is a diagram schematically showing in which direction liquid crystals are inclined when an electric field is applied to liquid crystals in a liquid crystal layer. FIG. 6 is a sectional view taken along line D-D shown in FIG. 5A.

In this semi-transmissive liquid crystal display panel 50, an inclined plane or a height difference 53 is formed by an interlayer film between a reflective portion 51 and a transmissive portion 52, and the reflective portion 51 and the transmissive portion 52 run continuously through the height difference 53 laid in between. The semi-transmissive liquid crystal display panel 50 has a first substrate 54 and a pixel electrode 55 formed thereon, and the pixel electrode 55 includes a first opening region (slit) 56, where no pixel electrode 55 is formed.

This first opening region 56 constitutes first alignment control means, and is formed so as to be astride the reflective portion 51 and the transmissive portion 52 with the height difference 53 laid in between. As a result, a pixel electrode 55a formed in the reflective portion 51 and a pixel electrode 55b formed in the transmissive portion 52 are connected to each other via a single line 57 extending in the direction of the length of the semi-transmissive liquid crystal display panel 50.

In a common electrode 59 formed on a second substrate 58, second opening regions 60a and 60b are so formed respectively as to face the pixel electrode 55a formed in the reflective portion 51 and the pixel electrode 55b formed in the transmissive portion 52. These second opening regions 60a and 60b constitute second alignment control means. The second opening regions 60a and 60b are formed as cross-shaped slits, and are arranged in such a way that, in the vertical direction, the center of the second opening region 60a coincides with the center of the pixel electrode 55a and the center of the second opening region 60b coincides with the center of the pixel electrode 55b.

In this semi-transmissive liquid crystal display panel 50, when an electric field is applied to the liquid crystal molecules 61 in the liquid crystal layer, as shown in FIGS. 5B and 6, the ends of the liquid crystal molecules 61, the ends being located on the side of the common electrode 59, are inclined toward the line 57 above the first opening region 56 in the height difference 53, and are inclined toward the center of the reflective portion 51 above the reflective portion 51 and toward the center of the transmissive portion 52 above the transmissive portion 52. As described above, according to the semi-transmissive liquid crystal display panel 50, the liquid crystal molecules are aligned in a given direction, making it possible to reduce degradation in visual characteristics or response speed.

In the MVA semi-transmissive liquid crystal display panel 50 described above, the height difference 53 is formed by the interlayer film between the reflective portion 51 and the transmissive portion 52, which are located on the first substrate 54 side, and thereby, as is well known, a cell gap d1 in the reflective portion 51 and a cell gap d2 in the transmissive portion have the relationship d1=(d2)/2. In this way, adjustment is performed so that the image quality in the reflective portion 51 and the image quality in the transmissive portion 52 are made equal to each other. Such a cell gap adjustment can be performed on the second substrate 58 side, as practiced in another conventionally known type of MVA semi-transmissive liquid crystal display panel.

As another conventional example, an MVA semi-transmissive liquid crystal display panel having a topcoat layer for a cell gap adjustment formed on a second substrate side will be described with reference to FIGS. 7 to 8. FIG. 7 is a plan view showing one pixel of a conventional semi-transmissive liquid crystal display panel having a topcoat layer for a cell gap adjustment formed on a second substrate side, as seen through the second substrate. FIG. 8 is a sectional view taken along line C-C shown in FIG. 7.

In a semi-transmissive liquid crystal display panel 70, a plurality of scan lines 12 and signal lines 13 are arranged so as to form a matrix, directly or via an inorganic insulating film 14, on an insulating transparent glass substrate 11 serving as a first substrate. Here, an area enclosed by the scan and signal lines 12 and 13 corresponds to one pixel, each pixel has an unillustrated thin-film transistor TFT (thin film transistor) serving as a switching element, and the surface of the TFT, for example, is coated with a protective insulating film 23.

In a reflective portion 15 and a transmissive portion 16, an interlayer film 17 is laid on top of the scan lines 12, the signal lines 13, the inorganic insulating film 14, and the protective insulating film 23, for example. In the reflective portion 15, the interlayer film 17 is formed of an organic insulating film having fine projections and depressions on the surface thereof; in the transmissive portion 16, the interlayer film 17 is formed of an organic insulating film having a flat surface. Note that, in FIGS. 7 and 8, the projections and depressions formed in the reflective portion 15 are not shown. The interlayer film 17 has a contact hole 20 in a part thereof that corresponds to the drain electrode D of the TFT. In each pixel, the reflective portion 15 has a reflecting layer 18 made of aluminum, for example, formed on the surface of the interlayer film 17. On the surface of this reflecting layer 18 and the surface of the interlayer film 17 formed in the transmissive portion 16, a transparent pixel electrode 19 made of ITO (indium tin oxide) or IZO (indium zinc oxide), for example, is formed.

In the reflective portion 15, an auxiliary capacity line 21 is disposed below the reflecting layer 18 formed on the surface of the interlayer film 17, and the reflecting layer 18 and the pixel electrode 19 are formed in such a way that, as seen in a plan view, they do not abut on a reflecting layer and a pixel electrode of an adjacent pixel and that they slightly overlap the scan line 12 and the signal line 13 for preventing light leakage. Likewise, in the transmissive portion 16, the pixel electrode 19 is formed in such a way that, as seen in a plan view, it does not abut on a pixel electrode and a reflecting layer of an adjacent pixel and that it slightly overlap the scan line 12 and the signal line 13.

In this semi-transmissive liquid crystal display panel 70, a slit 33 is formed in the pixel electrode 19 for controlling the alignment of liquid crystal molecules along the boundary between the reflective portion 15 and the transmissive portion 16. As a result, the pixel electrode 19 is practically divided into two regions: one of which is a pixel electrode 19a formed in the reflective portion 15 and the other is a pixel electrode 19b formed in the transmissive portion 16. The pixel electrode 19a formed in the reflective portion 15 and the pixel electrode 19b formed in the transmissive portion 16 are electrically connected to each other via a smaller-width portion 34. A vertical alignment film (unillustrated) is laid on the surface of the pixel electrode 19 in such a way that all the pixels are coated therewith.

On the other hand, on the display region of an insulating transparent glass substrate 25 serving as a second substrate, a stripe-shaped color filter layer 26 having a color corresponding to each pixel, that is, one of three colors: red (R), green (G), or blue (B), is formed. Here, the thickness of the color filter layer 26 is uniform in the reflective portion 15 and the transmissive portion 16, and the color filter layer 26 has a topcoat layer 27 having a predetermined thickness in a part thereof that corresponds to the reflective portion 15. The topcoat layer 27 is formed over the entire length and breadth of the reflective portion 15, and the thickness thereof is adjusted so that the thickness of a layer of liquid crystals 29 in the reflective portion 15, i.e., the cell gap d1 is half the thickness of the cell gap d2 in the transmissive portion 16, that is, $d1=(d2)/2$.

In addition, protrusions 31 and 32 for controlling the alignment of the liquid crystals are formed respectively on the part of the surface of the color filter layer 26 located in the transmissive portion 16 and on the part of the surface of the topcoat layer 27 located in the reflective portion 15. On the surfaces of the color filter layer 26, the topcoat layer 27, and the protrusions 31 and 32, a common electrode (unillustrated) and a vertical alignment film (unillustrated) are laid on top of another.

The first substrate and the second substrate are then located face-to-face, and then bonded together by means of a sealing member provided around them. Then, a space between the substrates is filled with liquid crystals 29 with negative dielectric anisotropy. In this way, the MVA semi-transmissive liquid crystal display panel 70 is obtained. Although not shown in the figure, a conventionally known backlight provided with a light source, a light guide plate, and a diffusing sheet, for example, is disposed below the first substrate.

In the MVA semi-transmissive liquid crystal display panels 50 and 70 described above, when no electric field is applied between the pixel electrode and the common electrode, the liquid crystal molecules in the liquid crystal layer are aligned with their long axes perpendicular to the surfaces of the pixel electrode and the common electrode, blocking the passage of light; when an electric field is applied between the pixel electrode and the common electrode, the light is allowed to pass through. This reduces the influence of light leakage occurring in the transmissive portion on the image quality. Furthermore, the presence of the alignment control means formed as a slit formed in the pixel electrode and slits or protrusions formed in the common electrode makes the liquid crystal molecules inclined toward the alignment control means formed in the common electrode when an electric field is applied between the pixel electrode and the common electrode, greatly improving the viewing angle.

In addition to the above-described MVA semi-transmissive liquid crystal display panel provided with alignment control means formed as a slit or a protrusion, there have conventionally been known also VA (vertical aligned) or TN (twisted nematic) semi-transmissive liquid crystal display panels provided with no alignment control means formed as a slit or a protrusion. FIG. 9 is a plan view showing one pixel of such a conventional VA or TN semi-transmissive liquid crystal display panel 80, as seen through a second substrate. FIG. 9 differs from the conventional MVA semi-transmissive liquid crystal display panel 70 shown in FIGS. 7 and 8 only in that it does not have alignment control means formed as a slit or a protrusion, for example, and therefore, in the following description, such members as are found also in the conventional MVA semi-transmissive liquid crystal display panel 70 will be identified with common reference characters, and their explanations will not be repeated.

In such conventional semi-transmissive liquid crystal display panels described above, a contact hole 20 is generally formed at the center of a reflecting layer 18 as shown in FIGS. 7 to 9, and the contact hole 20 is formed, in general, as follows. First, as shown in FIG. 8, for example, to insulate the surface of the TFT and the like of each pixel formed on the first substrate, the entire display region is coated with a protective insulating film 23 formed of silicon oxide or silicon nitride. Then, an interlayer film 17 formed of a photoresist, for example, is applied only to a reflective portion 15 or to the entire display region, and then exposure and development are performed, whereby an opening of a contact hole portion is formed in the interlayer film 17.

The entire surface of the interlayer film 17 is then covered with a coating of reflecting layer forming material such as aluminum, and is then applied with a photoresist. Then, exposure and etching are performed by using a photomask pattern that is so designed that the reflecting layer forming material is formed into a reflecting layer 18 having a predetermined pattern and that an opening of the contact hole portion is formed therein. As a result, the reflecting layer 18 having a predetermined pattern is formed, and an opening of the contact hole portion is formed therein. The entire surface thereof is then applied with a photoresist, and then exposure and etching are performed by using a photomask pattern that is so designed that an opening of the contact hole portion is formed in the protective insulating film 23, whereby an opening is formed in the protective insulating film 23 according to a predetermined pattern. Then, a pixel electrode 19 formed of transparent conductive material such as ITO or IZO is formed so as to form a predetermined pattern, whereby electrical conduction between the pixel electrode 19 and the drain electrode D, which is a switching element, is established via the contact hole 20.

The problem here is that, since the photoresist applied to the surface of the coating of reflecting layer forming material also fills the opening of the contact hole portion formed in the interlayer film 17, the photoresist to be exposed to light is thicker inside the opening of the contact hole portion than in an inter-reflecting-layer region. It is for this reason that exposures are conventionally performed separately in the contact hole portion and in the inter-reflecting-layer region. For example, an exposure time of about 10 seconds is adopted for the photoresist in the contact hole portion, and an exposure time of about 5 seconds is adopted for the photoresist in the inter-reflecting-layer region.

As described above, exposures are conventionally performed separately in the contact hole portion and in the inter-reflecting-layer region. This disadvantageously makes the exposure a time-consuming process. Here, assume that exposures are performed for the photoresist formed on the surface of the reflecting layer forming material for about 10 seconds, which is a time period required for the exposure in the contact hole portion, so that exposures are performed in the contact hole portion and in the inter-reflecting-layer region at the same time. Then, since the exposure time of about 10 seconds is too long for the photoresist in the inter-reflecting-layer region, because it is thinner than that in the contact hole portion, the distance between the adjacent reflecting layers undesirably becomes greater than a design value. When liquid crystal display panels are mass-produced, the longer exposure time leads to reduction in production efficiency due to accumulated exposure time. For this reason, it has become urgent to reduce the exposure time in each process.

SUMMARY OF THE INVENTION

In view of the conventionally experienced problems described above, it is an object of the present invention to provide a semi-transmissive liquid crystal display panel that revises the position where a contact hole is formed, so that exposures can be performed in a contact hole portion and in an inter-reflecting-layer region at the same time when a reflecting layer having a predetermined pattern and an opening of the contact hole are formed by performing exposure for a photoresist applied on a reflecting layer forming material.

To achieve the above object, according to the present invention, a semi-transmissive liquid crystal display panel is provided with: a first substrate divided into sections by signal lines and scan lines arranged so as to form a matrix, each section having a switching element and a pixel electrode, the pixel electrode having transmissive and reflective portions; a second substrate having a color filter layer and a common electrode; and a liquid crystal layer sealed in between the first substrate and the second substrate. Here, at least the reflective portion of the first substrate has an interlayer film formed therein for separating the pixel electrode and the switching element, and a reflecting layer located below the pixel electrode, the reflecting layer has a notch portion at the edge thereof, and the pixel electrode formed in the reflective portion is electrically connected to an electrode of the switching element via a contact hole that is formed through the interlayer film in a part thereof corresponding to the notch portion.

With this structure, the following advantage is obtained. Since the reflecting layer has a notch portion at the edge thereof and a contact hole is formed in a position corresponding to the notch portion, a mask that is used when a photoresist is exposed to light is open toward the transmissive portion or an adjacent reflecting layer at an end thereof that corresponds to the notch portion of the reflecting portion. From this open end of the mask, part of exposure light leaks into an opening of a contact hole portion due to a scattering of light. As a result, even when a photoresist applied to the surface of a coating of reflecting layer forming material becomes thicker inside the opening of the contact hole portion than in an inter-reflecting-layer region at the time of formation of a reflecting layer, exposures of the photoresist in the contact hole portion and the photoresist in the inter-reflecting-layer region can be performed at the same time and in a shorter time period compared to the conventional example, enhancing production efficiency of the semi-transmissive liquid crystal display panel.

Here, the pixel electrode and the reflecting layer are formed on an interlayer film formed over the entire display region of the first substrate, and a topcoat layer is formed on the second substrate in a part thereof corresponding to the reflective portion.

With this structure, since the surface of the interlayer film formed on the first substrate is planarized, the surfaces of the pixel electrode and the reflecting layer formed on the surface of the interlayer film can also be planarized. This reduces disturbance in the alignment of the liquid crystal molecules, and the topcoat layer makes it easy to set a cell gap in the reflective portion at a predetermined value. As a result, it is possible to obtain a semi-transmissive liquid crystal display panel that offers satisfactory image quality.

Here, the pixel electrode has a slit between the transmissive portion and the reflective portion, the second substrate has alignment control means at least in a part thereof that corresponds to the transmissive portion, a vertical alignment film is laid on the surfaces of the first and second substrates, and the liquid crystal layer is formed of liquid crystals with negative dielectric anisotropy.

With this structure, it is possible to obtain an MVA semi-transmissive liquid crystal display panel with wide viewing angle that suffers less from disturbance in the alignment of the liquid crystal molecules and thereby offers satisfactory image quality, and that offers fast response speed. It is only necessary that the alignment control means be formed at least on the second substrate in a part thereof that corresponds to the transmissive portion, and whether or not to form the alignment control means in the reflective portion may be determined on an as needed basis.

Here, the notch portion of the reflecting layer is so formed as to face a smaller-width portion of the pixel electrode.

With this structure, since the notch portion of the reflecting layer is so formed as to face the smaller-width portion of the pixel electrode, a height difference is prevented from being produced in the smaller-width portion of the pixel electrode due to an edge portion of the reflecting layer. This reduces the possibility of the smaller-width portion of the pixel electrode being broken at the time of production or use. This makes it possible to obtain an MVA semi-transmissive liquid crystal display panel with wide viewing angle that suffers less from disturbance in the alignment of the liquid crystal molecules and thereby offers satisfactory image quality, that offers fast response speed, and that offers satisfactory production efficiency and a satisfactorily long useful life.

Here, the alignment control means is formed as a protrusion.

With this structure, the alignment control means with a simple structure provides an MVA semi-transmissive liquid crystal display panel that offers a wide viewing angle and fast response speed.

Here, the alignment control means is formed as a slit formed in the common electrode.

With this structure, the alignment control means with a simple structure provides an MVA semi-transmissive liquid crystal display panel that offers a wide viewing angle and fast response speed.

Here, as seen in a plan view, the pixel electrode formed in the transmissive portion does not overlap the signal line, and overlaps the scan line.

Incidentally, in an MVA semi-transmissive liquid crystal display panel, when no electric field is applied, even when a pixel electrode does not overlap scan and signal lines in a transmissive portion, as seen in a plan view, there is no possibility of light leakage. However, a voltage applied to the scan line varies greatly, affecting the liquid crystal molecules. This may cause disturbance in the alignment of the liquid crystal molecules in the transmissive portion near the scan line, causing leakage of light. By adopting the structure of the present invention, since the electric field produced by the scan line is blocked by the pixel electrode, it does not affect the liquid crystal molecules. This makes it possible to obtain an MVA semi-transmissive liquid crystal display panel that suffers less from light leakage occurring in the transmissive portion, and that offers high contrast and satisfactory image quality.

DETAILED DESCRIPTION OF PREFERRED EMBODIMENTS

Hereinafter, embodiments of the present invention will be described specifically with reference to the accompanying drawings. It should be understood, however, that the embodiments presented below are simply intended to give an example of a semi-transmissive liquid crystal display panel that embodies the technical idea of the present invention, and therefore the semi-transmissive liquid crystal display panel specifically described below is not intended to limit in any way the manner in which to carry out the present invention. That is, the present invention finds wide application in the technical fields to which the appended claims are directed.

Figure 1:
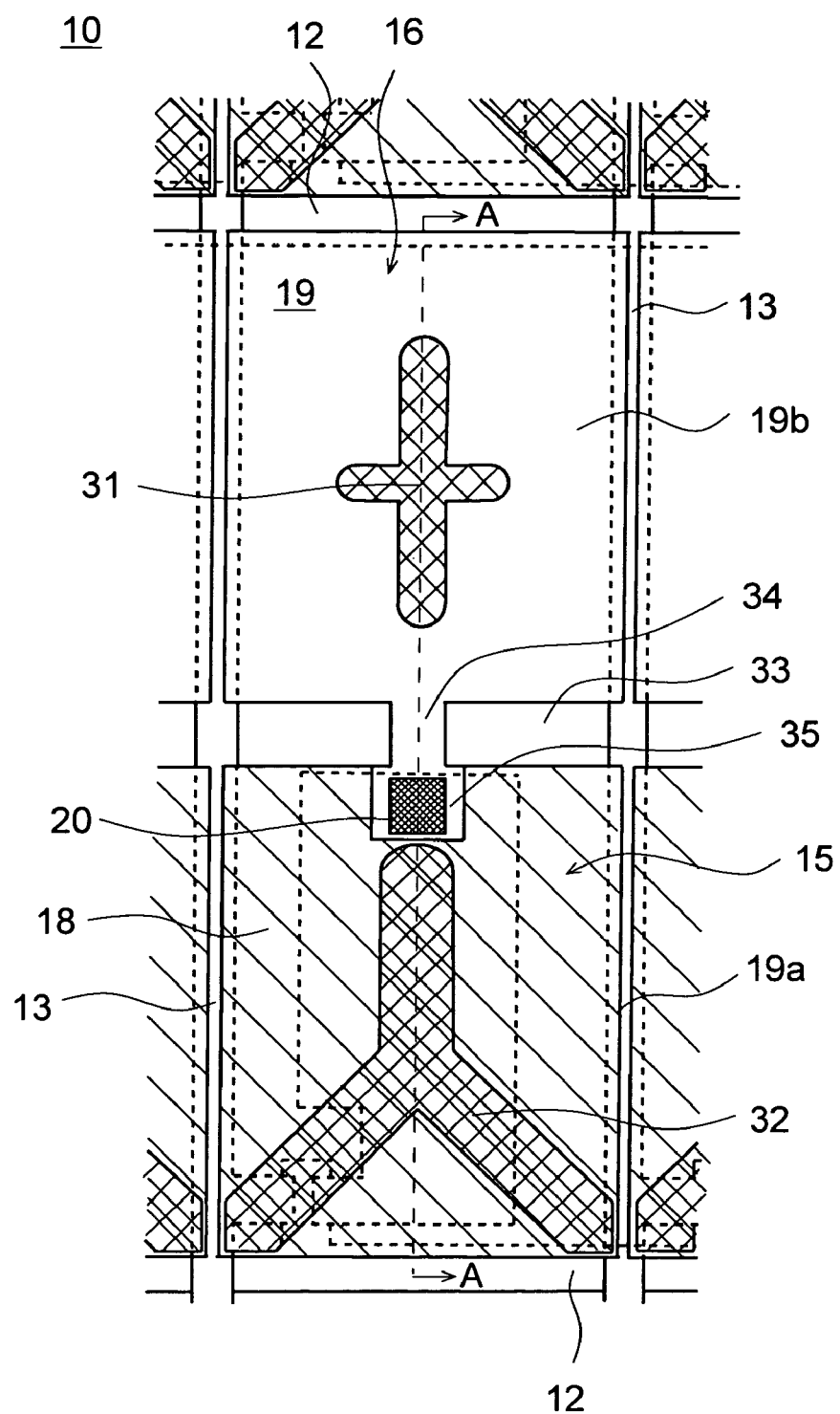
FIG. 1 is a plan view showing one pixel of the MVA semi-transmissive liquid crystal display panel embodying the present invention, as seen through the second substrate.
Figure 2:
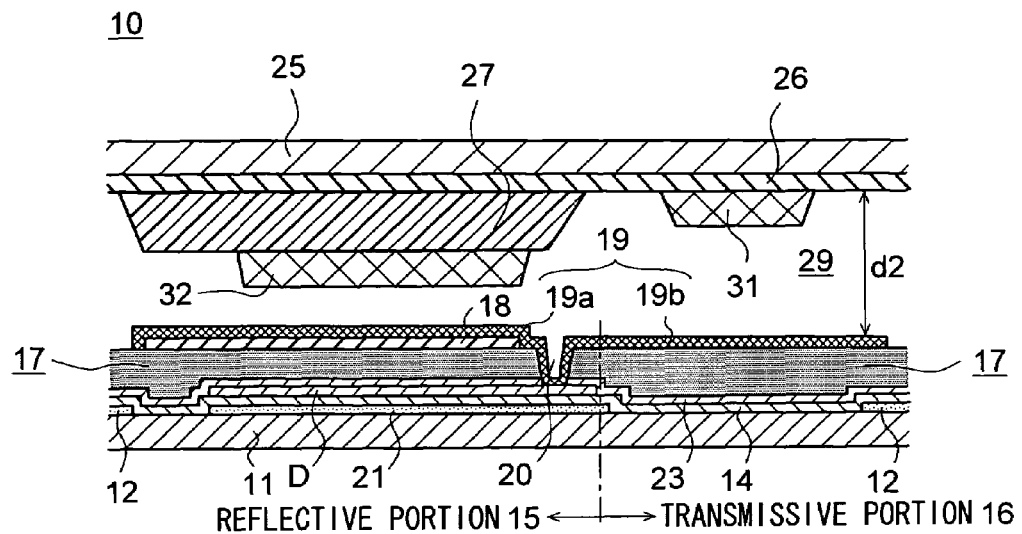
FIG. 2 is a sectional view taken along line A-A shown in FIG. 1.
Figure 3:
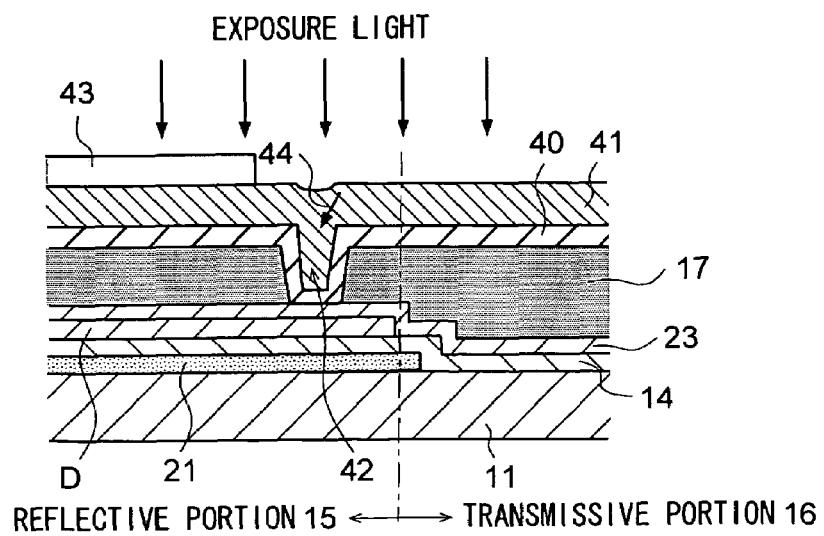
FIG. 3 is a diagram showing the positional relationship between the photoresist and the photomask near the contact hole formation portion when the reflecting layer forming material is exposed to light.

An MVA semi-transmissive liquid crystal display panel 10 embodying the present invention will be described with reference to FIGS. 1 to 3. FIG. 1 is a plan view showing one pixel of the MVA semi-transmissive liquid crystal display panel 10, as seen through the second substrate. FIG. 2 is a sectional view taken along line A-A shown in FIG. 1. FIG. 3 is a diagram showing the positional relationship between the photoresist and the photomask near the contact hole formation portion when the reflecting layer forming material is exposed to light. In the following description, such members as are found also in the conventional MVA semi-transmissive liquid crystal display panel 70 described in FIGS. 7 and 8 will be identified with common reference characters, and their explanations will not be repeated.

Figure 7:
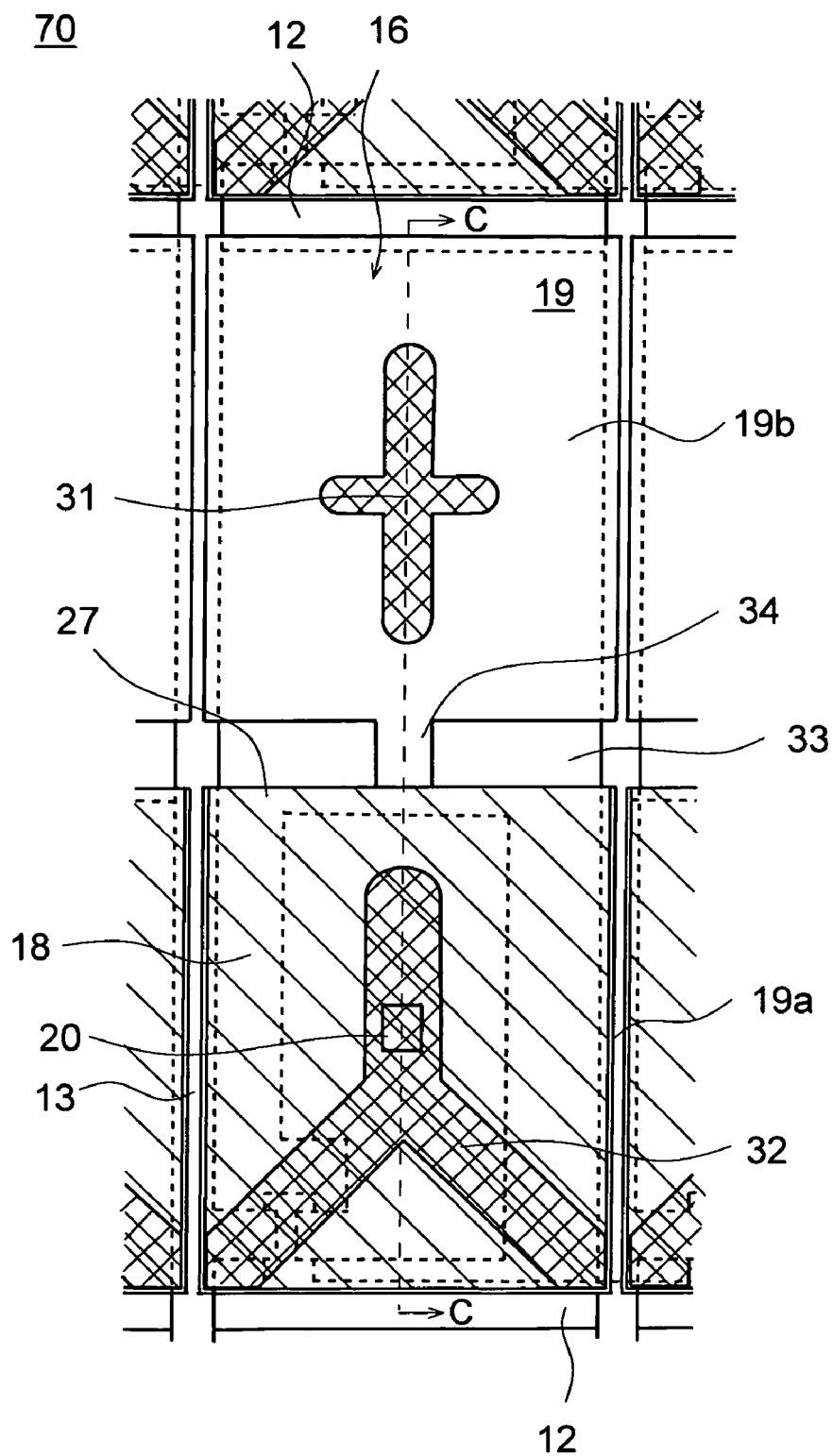
FIG. 7 is a plan view showing one pixel of a conventional semi-transmissive liquid crystal display panel, as seen through a second substrate, in which a topcoat layer for cell gap adjustment is provided on the second substrate side.
Figure 8:
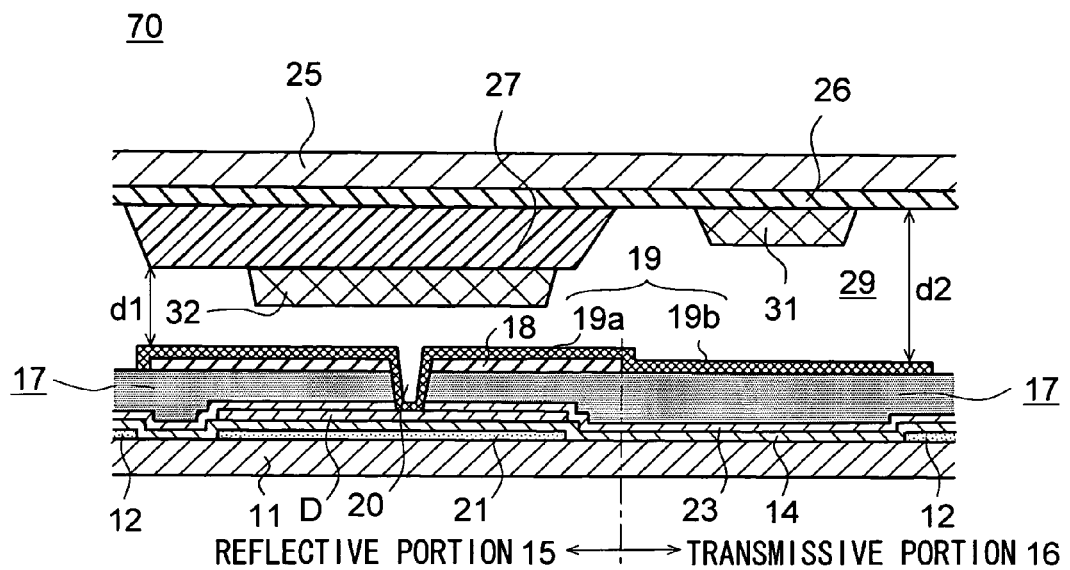
FIG. 8 is a sectional view taken along line C-C shown in FIG. 7.
Figure 9:
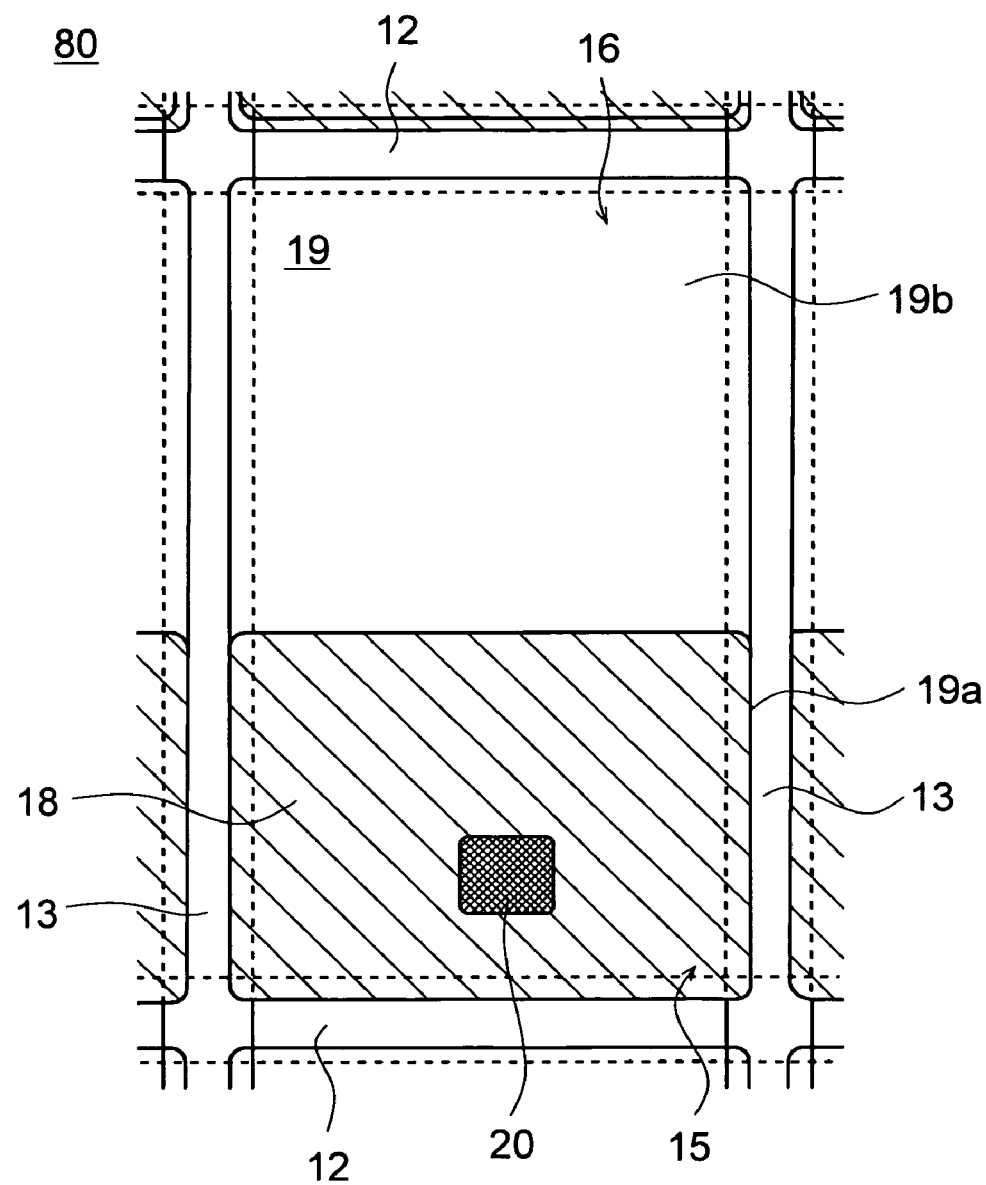
FIG. 9 is plan view showing one pixel of another example of a conventional semi-transmissive liquid crystal display panel, as seen through a second substrate.

The MVA semi-transmissive liquid crystal display panel 10 differs from the conventional MVA semi-transmissive liquid crystal display panel 70 described in FIGS. 7 and 8 in the position of a contact hole 20 and the shape of a reflecting layer 18, the contact hole 20 and the reflecting layer 18 being located on the reflective portion side. That is, in the conventional MVA semi-transmissive liquid crystal display panel 70, the contact hole 20 is formed at the center of a reflective portion 15, and the reflecting layer 18 has an opening through which the contact hole 20 is formed. By contrast, in the MVA semi-transmissive liquid crystal display panel 10 embodying the present invention, a notch portion 35 is formed at the edge of the reflecting layer 18, and the contact hole 20 is formed in a position corresponding to the notch portion 35.

How to form the contact hole 20 of the MVA semi-transmissive liquid crystal display panel 10 embodying the present invention will be described with reference to FIG. 3. First, as in the case of the conventional example, to insulate the surface of, for example, a TFT, which is a switching element, of each pixel formed on the surface of a first substrate, the entire display region is coated with a protective insulating film 23 formed of silicon oxide or silicon nitride. Then, an interlayer film 17 formed of a photoresist, for example, is applied only to the reflective portion 15 or to the entire display region, and then exposure and development are performed, whereby an opening of a contact hole portion is formed in the interlayer film 17.

Then, the entire surface of the interlayer film 17 is covered with a coating 40 of reflecting layer forming material such as aluminum, and is then applied with a photoresist 41. At this time, the photoresist 41 fills an opening 42 of the contact hole formation portion, making the photoresist to be exposed to light particularly thick in the opening 42. It is for this reason that, in the conventional example, an exposure time of about 10 seconds is adopted for the photoresist filling the opening 42 of the contact hole formation portion, and an exposure time of about 5 seconds is adopted for the photoresist for use in performing desired patterning in an inter-reflecting-layer region.

However, in this embodiment, the photoresist filling the opening 42 of the contact hole formation portion and the photoresist in the inter-reflecting-layer region are exposed to light at the same time by using a photomask 43 having a pattern that is so designed that the notch portion 35 (see FIG. 1) is formed at the edge of the reflecting layer. Here, adopted as an exposure time is, for example, about 8 seconds, which is a value intermediate between the conventional exposure time for the photoresist filling the opening 42 of the contact hole formation portion and the conventional exposure time for the photoresist for use in performing desired patterning in the inter-reflecting-layer region.

This exposure time of about 8 seconds is, despite being longer than the exposure time best suited to the photoresist for use in performing desired patterning in the inter-reflecting-layer region, so set as to prevent the coating 40 of reflecting layer forming material from being over-etched beyond a design value when the coating 40 of reflecting layer forming material is etched after exposure. This exposure time is, although too short to perform complete exposure of the photoresist filling the opening 42 of the contact hole formation portion, is optimal, and can be experimentally decided by giving consideration to the type of light source, the type of photoresist, and the film thickness of photoresist, for example.

As described above, this exposure time of about 8 seconds is normally too short to perform complete exposure of the photoresist filling the opening 42 of the contact hole formation portion, but nevertheless permits this photoresist to be completely exposed. The reason is as follows. That is, in this embodiment, the position where the contact hole is formed necessitates to use the photomask 43 having a pattern that is so designed that the notch portion 35 is formed at the edge of the reflecting layer, and this photomask 43 is open toward the transmissive portion in a part thereof that corresponds to the notch portion 35. Since no photomask 43 is provided on the transmissive portion 16 side, the photoresist 41 located on the transmissive portion 16 side is illuminated with a large amount of exposure light. Incidentally, this exposure light includes not only a rectilinear component but also a component of scattering light 44, and a large amount of scattering light 44 is produced from the photoresist 41 located on the transmissive portion 16 side. Part of this scattering light 44 travels from the transmissive portion 16 side toward the open end of the photomask 43, practically increasing the exposure of the photoresist 41 filling the opening 42 of the contact hole formation portion.

However, as in the conventional example, in a case where the contact hole 20 is located at the center of the reflecting layer 18 and thus the opening 42 of the contact hole formation portion is enclosed with the photomask 43, the amount of the scattering light 44 is too small to help increase the amount of exposure of the photoresist 41 filling the opening 42 of the contact hole formation portion.

After the predetermined exposure is performed as described above, development is performed, and then etching is performed on the coating 40 of reflecting layer forming material to form the reflecting layer 18 having a predetermined pattern. The entire surface thereof is then applied with a photoresist, and then exposure and etching are performed by using a photomask pattern that is so designed that an opening of the contact hole portion is formed in the protective insulating film 23, whereby an opening is formed in the protective insulating film 23 according to a predetermined pattern. Then, a pixel electrode 19 formed of transparent conductive material such as ITO or IZO is formed so as to form a predetermined pattern, whereby electrical conduction between the pixel electrode 19 and the drain electrode D is established via the contact hole 20.

According to the MVA semi-transmissive liquid crystal display device 10 of this embodiment produced as described above, it is possible to perform exposures of the photoresist filling the opening 42 of the contact hole formation portion and the photoresist in the inter-reflecting-layer region at the same time and in a short time period. As compared to the conventional example, this makes it possible to greatly reduce the exposure time to about half, enhancing production efficiency of the semi-transmissive liquid crystal display panel.

Furthermore, in this embodiment, the position where the contact hole 20 is formed, that is, the notch portion 35 of the reflecting layer 18 is formed so as to face the transmissive portion 16 and to face a smaller-width portion 34, which is formed in the pixel electrode 19 by means of a slit 33. This prevents the edge portion of the reflecting layer 18 from making contact with the smaller-width portion 34 of the pixel electrode 19, and thereby preventing a height difference from being produced in the smaller-width portion 34 of the pixel electrode 19 due to the presence of the reflecting layer 18. This advantageously reduces the possibility of the smaller-width portion 34 of the pixel electrode 19 being broken at the time of production or use.

This embodiment deals with a case in which the notch portion 35 of the reflecting layer 18, that is, the contact hole 20 is so formed as to face the transmissive portion 16. It is to be understood, however, that the same benefit can be obtained when the notch portion 35 is formed at the edge of the reflecting layer 18, because such notch portion 35 necessitates the use of a photomask having a pattern that is open at one side as the photomask 43 used at the time of exposure of the photoresist formed on the coating 40 of reflecting layer forming material. Thus, the notch portion 35 formed at the edge of the reflecting layer 18 may be so formed as to face the signal line 13 or the scan line 12.

The embodiment described above deals with the MVA semi-transmissive liquid crystal display panel 10 in which the reflecting layer 18 and the pixel electrode 19 formed in the reflective portion 15 are so formed as not to abut on a reflecting layer and a pixel electrode of an adjacent pixel, and as to slightly overlap the scan line 12 and the signal line 13 for preventing light leakage; the pixel electrode 19 formed in the transmissive portion 16 is so formed as not to abut on a pixel electrode and a reflecting layer of an adjacent pixel, and as to slightly overlap the scan line 12 and the signal line 13. Inherently, in an MVA semi-transmissive liquid crystal display panel, light does not pass through a liquid crystal layer as long as liquid crystal molecules are vertically aligned when no electric field is applied thereto.

Thus, in the MVA liquid crystal display panel 10 of the embodiment described above, even when the pixel electrode 19b formed in the transmissive portion 16 does not overlap the scan and signal lines, as seen in a plan view, the vertical alignment film formed thereabove prevents the light from passing therethrough. This eliminates at least the need to make the pixel electrode 19b formed in the transmissive portion 16 overlap the scan and signal lines, as seen in a plan view. By adopting such a structure, it is possible to make narrower the widths of the scan and signal lines, helping increase the aperture ratio of the transmissive portion. This makes it possible to obtain a bright MVA semi-transmissive liquid crystal display panel. Likewise, since a vertical alignment film is also formed above the slit 33 formed in the pixel electrode 19, the light does not pass therethrough. It is for this reason that, to increase the auxiliary capacity of the MVA semi-transmissive liquid crystal display panel 10 of this embodiment, the auxiliary capacity line 21 extends from under the reflecting layer 18 to the transmissive portion 16 side beyond the slit 33.

It is to be noted that, since the amplitude of voltage applied to the scan line 12 is large, the alignment of the liquid crystal molecules may be affected by the voltage applied to the scan line 12. Thus, it is preferable that the pixel electrode 19b formed in the transmissive portion 16 overlap the scan line 12, as seen in a plan view, at least where the pixel electrode 19b lies along the scan line 12. Furthermore, the embodiment described above deals with an example where the pixel electrode 19b formed in the transmissive portion 16 is in a rectangular shape. However, to ensure less disturbance in the alignment of the liquid crystal molecules, the pixel electrode 19b may be in a rounded rectangular shape or in a round shape. Also in this case, it is preferable that the pixel electrode 19b partially overlap the scan line 12, as seen in a plan view, at least where the pixel electrode 19b lies along the scan line 12.

The embodiment described above deals with the MVA semi-transmissive liquid crystal display panel 10 in which the pixel electrode 19 is divided by the slit 33 into two regions: one of which is a pixel electrode 19a formed in the reflective portion 15 and the other is a pixel electrode 19b formed in the transmissive portion 16. It is to be noted that, when the semi-transmissive liquid crystal display panel is actually used, the transmissive portion 16 is more used than the reflective portion 19 with the backlight on. It is for this reason that, in some cases, the area of the pixel electrode 19b formed in the transmissive portion 16 is made larger than that of the pixel electrode 19a formed in the reflective portion 15. In such a case, to prevent a disturbance from being produced in the alignment of the liquid crystal molecules throughout the transmissive portion 16, it is possible to divide the pixel electrode 19b formed in the transmissive portion by an extra slit into a plurality of regions, and then provide alignment control means one for each regions.

The embodiment described above deals with the MVA semi-transmissive liquid crystal display panel 10 in which, as alignment control means, a cross-shaped protrusion is formed in the transmissive portion and an inverted Y-shaped protrusion is formed in the reflective portion; however, it is also possible to use instead a bar-shaped or bullet-shaped protrusion, or, as disclosed in JP-A-2004-069767, to form a slit in a common electrode as alignment control means.

Figure 4:
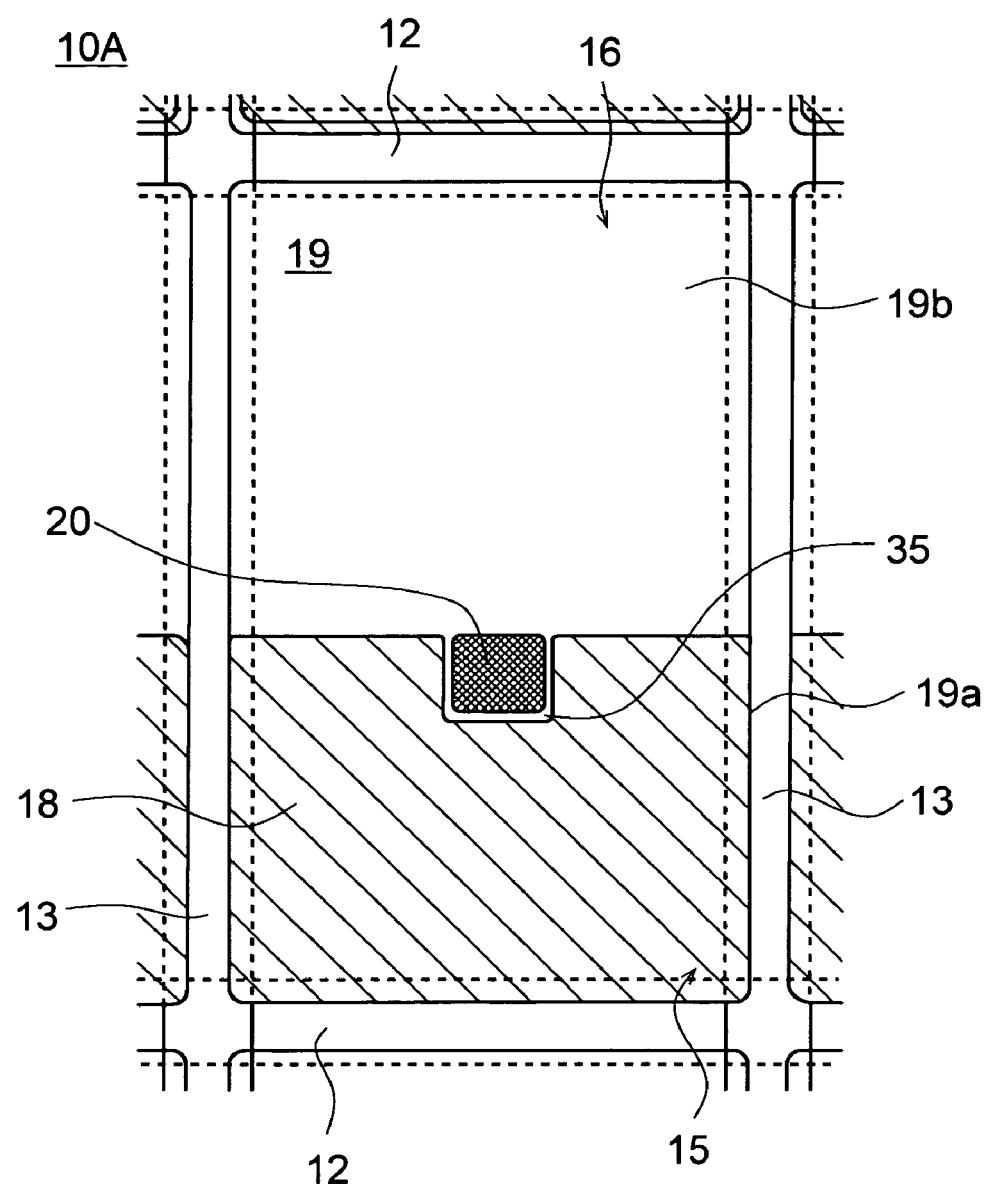
FIG. 4 is a plan view showing one pixel of another example of the semi-transmissive liquid crystal display panel embodying the present invention, as seen through the second substrate.
Figure 5A:
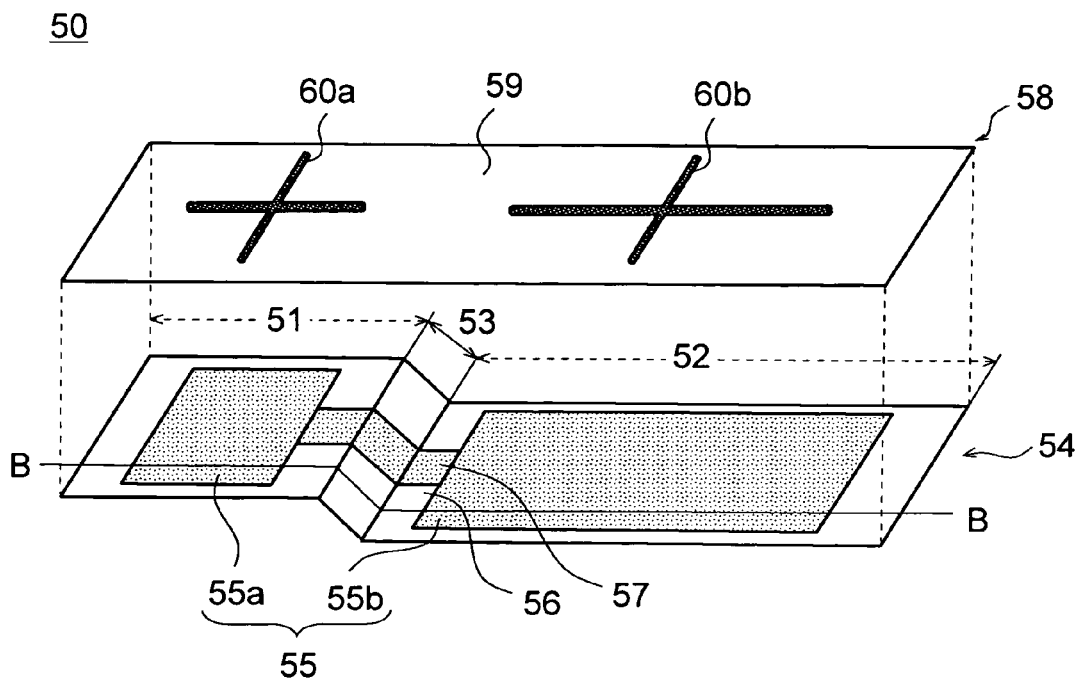
FIG. 5A is a perspective view schematically showing the structure of a conventional MVA semi-transmissive liquid crystal display panel.
Figure 5B:
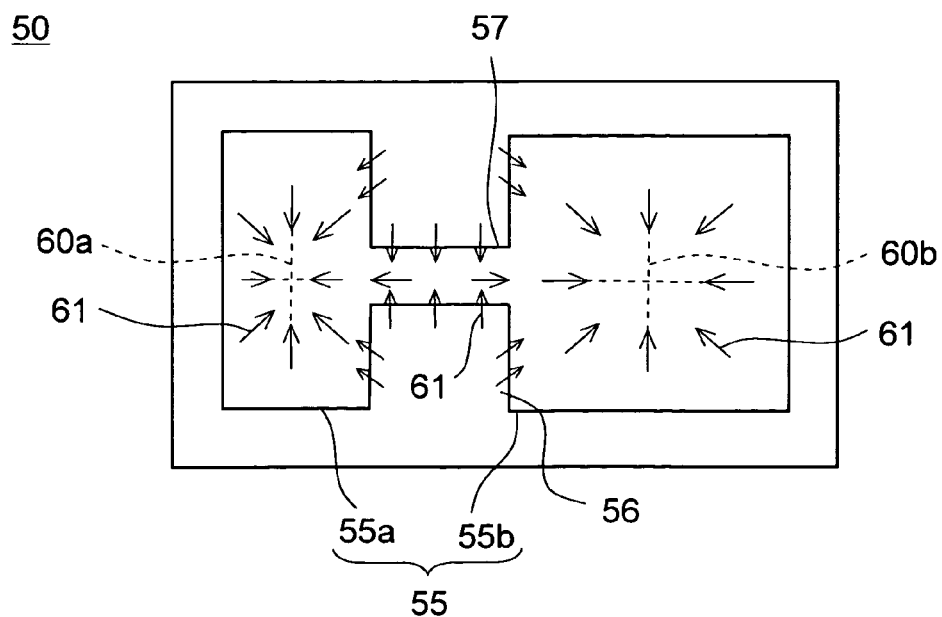
FIG. 5B is a diagram schematically showing how liquid crystals are inclined when an electric field is applied to liquid crystals in a liquid crystal layer.
Figure 6:
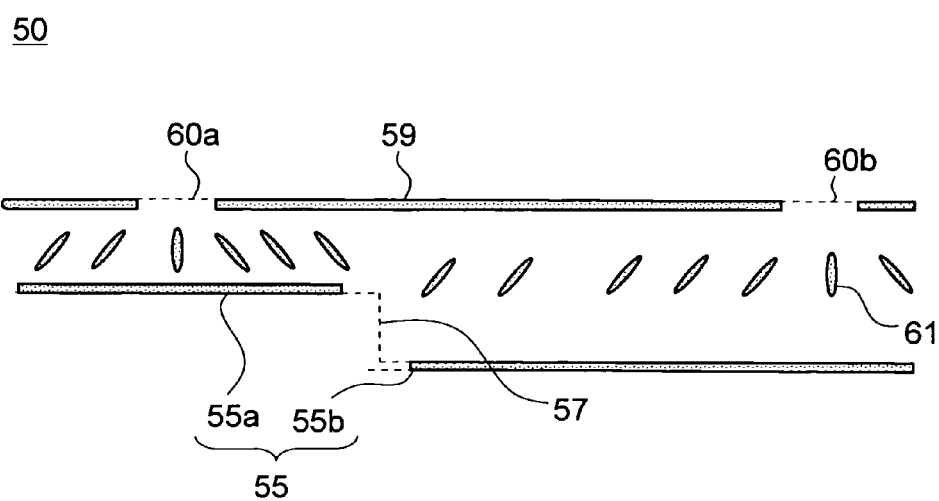
FIG. 6 is a sectional view taken along line B-B shown in FIG. 5A.

Furthermore, the embodiment described above deals with a case where the present invention is applied to the MVA semi-transmissive liquid crystal display device 10; however, it is also possible to apply the present invention to a VA or TN semi-transmissive liquid crystal display panel 10A, as shown in FIG. 4, that is not provided with the alignment control means 31 and 32. Also in this case, the notch portion 35 of the reflecting layer 18, that is, the contact hole 20 is so formed as to face the transmissive portion 16, as to face the signal line 13, or as to face the scan line 12.

What is claimed is:

1. A semi-transmissive liquid crystal display panel comprising:
 a first substrate divided into sections by signal lines and scan lines arranged so as to form a matrix, each section having a switching element and a pixel electrode, the pixel electrode having transmissive and reflective portions;
 a second substrate having a color filter layer and a common electrode; and
 a liquid crystal layer sealed in between the first substrate and the second substrate,
 wherein at least the reflective portion of the first substrate has an interlayer film formed therein for separating the pixel electrode and the switching element, and a reflecting layer located below the pixel electrode,
 wherein the reflective and transmissive portions of the pixel electrode are electrically connected to each other via a smaller-width portion as seen in a plan view,
 wherein the reflecting layer has a notch portion in a position facing the smaller-width portion of the pixel electrode as seen in a plan view, the notch portion being formed so as to have a width larger than a width of the smaller-width portion, and
 wherein the pixel electrode formed in the reflective portion is electrically connected to an electrode of the switching element via a contact hole that is formed through the interlayer film in a part thereof corresponding to the notch portion.

2. The semi-transmissive liquid crystal display panel of claim 1,
 wherein the pixel electrode and the reflecting layer are formed on an interlayer film formed over an entire display region of the first substrate, and
 wherein a topcoat layer is formed on the second substrate in a part thereof corresponding to the reflective portion.

3. The semi-transmissive liquid crystal display panel of claim 1,
 wherein the pixel electrode has a slit between the transmissive portion and the reflective portion,
 wherein the second substrate has alignment control means at least in a part thereof that corresponds to the transmissive portion,
 wherein a vertical alignment film is laid on surfaces of the first and second substrates, and
 wherein the liquid crystal layer is formed of liquid crystals with negative dielectric anisotropy.

4. The semi-transmissive liquid crystal display panel of claim 2,
 wherein the pixel electrode has a slit between the transmissive portion and the reflective portion,
 wherein the second substrate has alignment control means at least in a part thereof that corresponds to the transmissive portion,
 wherein a vertical alignment film is laid on surfaces of the first and second substrates, and
 wherein the liquid crystal layer is formed of liquid crystals with negative dielectric anisotropy.

5. The semi-transmissive liquid crystal display panel of claim 4, wherein the alignment control means is formed as a protrusion.

6. The semi-transmissive liquid crystal display panel of claim 4, wherein the alignment control means is formed as a slit formed in the common electrode.

7. The semi-transmissive liquid crystal display panel of claim 3, wherein, as seen in a plan view, the pixel electrode formed in the transmissive portion does not overlap the signal line, and overlaps the scan line.

* * * * *